(12) United States Patent
Herreshoff (10) Patent No.: US 10,776,714 B2
(45) Date of Patent: Sep. 15, 2020

(54) CONSTRUCTING AND PROCESSING COMPUTATIONAL GRAPHS FOR DYNAMICALLY STRUCTURED MACHINE LEARNING MODELS

(71) Applicant: Google Inc., Mountain View, CA (US)

(72) Inventor: Marcello Mathias Herreshoff, Mountain View, CA (US)

(73) Assignee: Google LLC, Mountain View, CA (US)

(*) Notice: Subject to any disclaimer, the term of this patent is extended or adjusted under 35 U.S.C. 154(b) by 922 days.

(21) Appl. No.: 15/344,160

(22) Filed: Nov. 4, 2016

(65) Prior Publication Data

US 2018/0129967 A1 May 10, 2018

(51) Int. Cl.
  *G06N 20/00* (2019.01)
  *G06N 5/02* (2006.01)
  *G06F 8/41* (2018.01)
  *G06F 40/20* (2020.01)

(52) U.S. Cl.
  CPC ............. *G06N 20/00* (2019.01); *G06N 5/02* (2013.01); *G06F 8/433* (2013.01); *G06F 8/45* (2013.01); *G06F 40/20* (2020.01)

(58) Field of Classification Search
  CPC .......... G06N 20/00; G06N 5/02; G06F 8/433; G06F 8/45
  USPC ........................................................ 706/12
  See application file for complete search history.

(56) References Cited

U.S. PATENT DOCUMENTS

| | | | | |
|---|---|---|---|---|
| 2010/0313184 A1* | 12/2010 | Gustafsson | ......... | G06F 9/45516 717/116 |
| 2011/0093414 A1* | 4/2011 | Xu | .......................... | G06F 17/27 706/12 |
| 2015/0186790 A1* | 7/2015 | Ehlen | ................ | G06F 16/24578 706/52 |
| 2017/0300828 A1* | 10/2017 | Feng | ....................... | G06N 20/00 |
| 2017/0310574 A1* | 10/2017 | Wolting | .................. | H04L 45/02 |
| 2018/0067923 A1* | 3/2018 | Chen | ................... | G06F 17/2705 |

OTHER PUBLICATIONS

Socher, "CS224d: Deep NLP—Lecture 9: Recursive Neural Networks", Stanford University, archived Sep. 18, 2015 at Internet Archive <https://web.archive.org/web/20150918002345/http://cs224d.stanford.edu/lectures/CS224d-Lecture9.pdf> (Year: 2015).*

(Continued)

*Primary Examiner* — James D. Rutten
(74) *Attorney, Agent, or Firm* — Fish & Richardson P.C.

(57) ABSTRACT

Methods, systems, and apparatus, including computer programs encoded on computer storage media, for constructing and processing computational graphs that represent dynamically structured machine learning models are disclosed. An example system receives data identifying a plurality of operations that can be performed on input data for processing by a dynamically structured machine learning model. The system also receives a plurality of labels corresponding to arguments for the plurality of operations. A directed computational graph representing a comprehensive layer of the dynamically structured machine learning model is generated from the identified operations and labels. An example system then receives an input for processing by the machine learning model and specifies data flow through the directed computational graph.

30 Claims, 6 Drawing Sheets (56) References Cited

OTHER PUBLICATIONS

T. E. Oliphant, "Python for Scientific Computing," in Computing in Science & Engineering, vol. 9, No. 3, pp. 10-20, May-Jun. 2007 (Year: 2007).*
PCT International Preliminary Report on Patentability in International Appln. No. PCT/US2017/060016, dated May 16, 2019, 8 pages.
Abadi et al. "TensorFlow: A system for large-scale machine learning," Proceedings of the $12^{th}$ USENIX Symposium on Operating Systems Design and Implementation, Nov. 2, 2016, 20 pages.
Bezati et al. "High-level synthesis of dynamic dataflow programs on heterogeneous MPSoC platforms," International Conference on Embedded Computer Systems: Architectures, Modeling and Simulation, Jul. 17, 2016, 8 pages.
International Search Report and Written Opinion issued in International Application No. PCT/US2017/060016, dated Feb. 7, 2018, 14 pages.
Looks et al. "Deep Learning with Dynamic Computation Graphs," arXiv1702.02181v2 ,Feb. 22, 2017, 12 pages.
The Theano Development Team: Rami Al-rfou et al. " Theano: A Python framework for fast computation of mathematical expressions," arXiv1605.02688v1, May 9, 2016, 19 pages.
Tokui et al. "Chainer: A Next-Generation Open Source Framework for Deep Learning," Jan. 1, 2015, 6 pages.
Abadi et al., "TensorFlow: Large-Scale Machine Learning on Heterogeneous Distributed Systems," (Nov. 9, 2015) (retrieved from http://download.tensorflow.org/paper/whitepaper2015.pdf), 19 pages.

* cited by examiner

CONSTRUCTING AND PROCESSING COMPUTATIONAL GRAPHS FOR DYNAMICALLY STRUCTURED MACHINE LEARNING MODELS

BACKGROUND

This specification relates to constructing and processing computational graphs that represent dynamically structured machine learning models.

Machine learning models receive input and generate output based on the received input and on values of model parameters. The operations performed by some machine learning models can be input-dependent and the machine learning models are therefore dynamically structured depending on their input.

SUMMARY

This specification describes technologies relating to machine learning systems in general, and specifically to systems and methods for constructing a single computational graph that represents input-dependent machine learning model architectures and scheduling input to be processed using the computational graph.

In general, one innovative aspect of the subject matter described in this specification can be embodied in methods that include the actions of receiving data identifying a plurality of operations that can be performed on input data for processing by a dynamically structured machine learning model; receiving a plurality of labels corresponding to arguments for the plurality of operations; generating a directed computational graph representing a comprehensive layer of the dynamically structured machine learning model from the identified operations and labels, wherein the comprehensive layer is a layer that includes each possible operation that can be performed by the dynamically structured machine learning model; receiving an input for processing by the dynamically structured machine learning model, wherein the input includes a plurality of tokens and label data specifying labels for the plurality of tokens; and specifying data flow through the directed computational graph to fit the received labeled data. An example system includes one or more computers and one or more storage devices storing instructions that when executed by the one or more computers cause the one or more computers to perform an example method.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Generating the directed computational graph can include: for each argument of the operations, inserting, into the computational graph, a respective variable representing a respective wiring vector that specifies a location of tokens having each label corresponding to the operation argument in a received input. Specifying data flow includes: for each argument for each operation, modifying the wiring vector to either (i) identify a location, in the input, of the token having the label corresponding to the argument or (ii) if no token has the label corresponding to the argument in the input, identify that no token of the argument exists in the input. Generating the directed computational graph can include: inserting, for each operation argument, a corresponding gather operation that receives as input the wiring vector associated with the operation argument and an input vector and outputs a result to the operation for which the operation argument corresponds. Generating a directed computational graph can include adding, to the computational graph, a concatenation operation to concatenate all results of operations in the layer. Specifying data flow through the single directed computational graph using the received labeled data can include: determining whether the label data has multiple levels of labels; in response to determining that the label data has multiple levels, generating, for each level of the label data, a copy of the computational graph as a new layer of the graph, wherein output of a previous layer of the computational graph is the input to a next layer of the graph. For each layer, the wiring vectors may be modified according to the corresponding level in the label data. The operations of the computational graph may be executed and a final gather operation may be used to select results as output of the model. A second input may be received for processing by the dynamically structured machine learning model that includes a second plurality of tokens and second labeled data different from the received input and the data flow through the layer of the single directed computational graph to fit the second labeled data. Executing the operations of the computational graph may include allocating the nodes in the computational graph across a plurality of devices and causing each of the devices to perform the operations represented by the nodes allocated to the device.

The subject matter described in this specification can be implemented in particular embodiments so as to realize one or more of the following advantages. By constructing a single computational graph that can accept input graphs of differing shapes to a dynamically structured machine learning model, a machine learning system can accept and efficiently process input data to the machine learning model that differs in shape. In particular, the system can process inputs of various shapes without requiring that the computational graph be rewritten for each input. Some customary systems forbid computational graph rewrites while others permit rewrites, but these rewrites are inefficient. Because no rewrites are necessary in an example system, the amount of computational resources needed to handle large-scale processing of inputs to dynamically structured models is reduced and input processing is more efficient. When an input is received to a dynamically structured machine learning model, the computational graph representing the model does not have to be rewritten and the input can efficiently be scheduled for processing by multiple hardware devices.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A dynamically structured machine learning model has various shapes depending on the input it receives. That is, the operations performed by the dynamically structured machine learning model to generate an output from a received input will differ depending on the characteristics of the input.

An example of a dynamically structured machine learning model is a recursive neural network that is generated by traversing a given structure in topological order. Other examples of a dynamically structured machine learning model include a high dimensional sparse variant of grid long short-term memory and arbitrary architectures containing multiple long short-term memories of example-dependent depth. Additional examples of dynamically structured machine learning models include graph convolutional neural networks and tree long short-term memories. The dynamically structured machine learning model can be configured to receive any kind of digital data input and to generate any kind of score, classification, or regression output based on the input.

For example, the dynamically structured machine learning model can receive as input an input text segment and a parse tree of the input text segment and can process the text segment to generate a natural language processing output for the text segment, e.g., to classify the text segment as relating to one or more topics, to classify the sentiment of the text segment, to predict one or more words that should follow the input text segment, and so on. As another example, the dynamically structured machine learning model can generate a numeric representation of the text segment, e.g., a vector or other ordered collection of numeric values that represents that text segment, that can be processed by another machine learning model or system to generate a natural language processing output for the text segment or to otherwise classify the text segment.

In particular, in these examples, input words from sequences are parsed into parse trees to show the grammatical structure of each sequence. Each input to the model can include a word sequence and a parse tree of the word sequence that classifies words as one or more parts of a sentence including: determiners (D), adjectives (ADJ), nouns (N), adverbs (ADV), verbs (V), noun phrases (NP), and verb phrases (VP).

As another example, the dynamically structure machine learning model can take in arbitrary structured data, such as JSON or Protocol buffers, and construct a generic machine learning model. As still another example, the dynamically structured machine learning model can receive a graph structure of chemical properties to construct a machine learning model to determine the chemical properties of models.

Some systems represent operations of a machine learning model, e.g., operations to generate an inference from an input or to train the model, as a computational graph of nodes and directed edges in order to process inputs to the machine learning model or to train the machine learning model.

However, once the structure of a computational graph representing a machine learning model is defined, it can be very difficult to modify the graph structure to accept different shapes of input data. In some conventional systems, it is impossible to modify the graph structure. In other conventional systems, the systems permit modification, but the system may not be designed to quickly modify a graph. Therefore, in order to process data of different shapes for a dynamically structured model, existing systems have to build a new computational graph for each input shape. This process of constructing multiple computational graphs is inefficient and complex, making it difficult to represent a dynamically structured machine learning model in a system that performs processing of inputs to machine learning models by representing the machine learning models as computational graphs.

An example system as described in this specification can easily and efficiently represent an input-dependent, dynamically structured machine learning model by constructing a single computational graph that emulates the behavior of all possible input data graphs or tree structures for a given dataset.

Figure 1A:
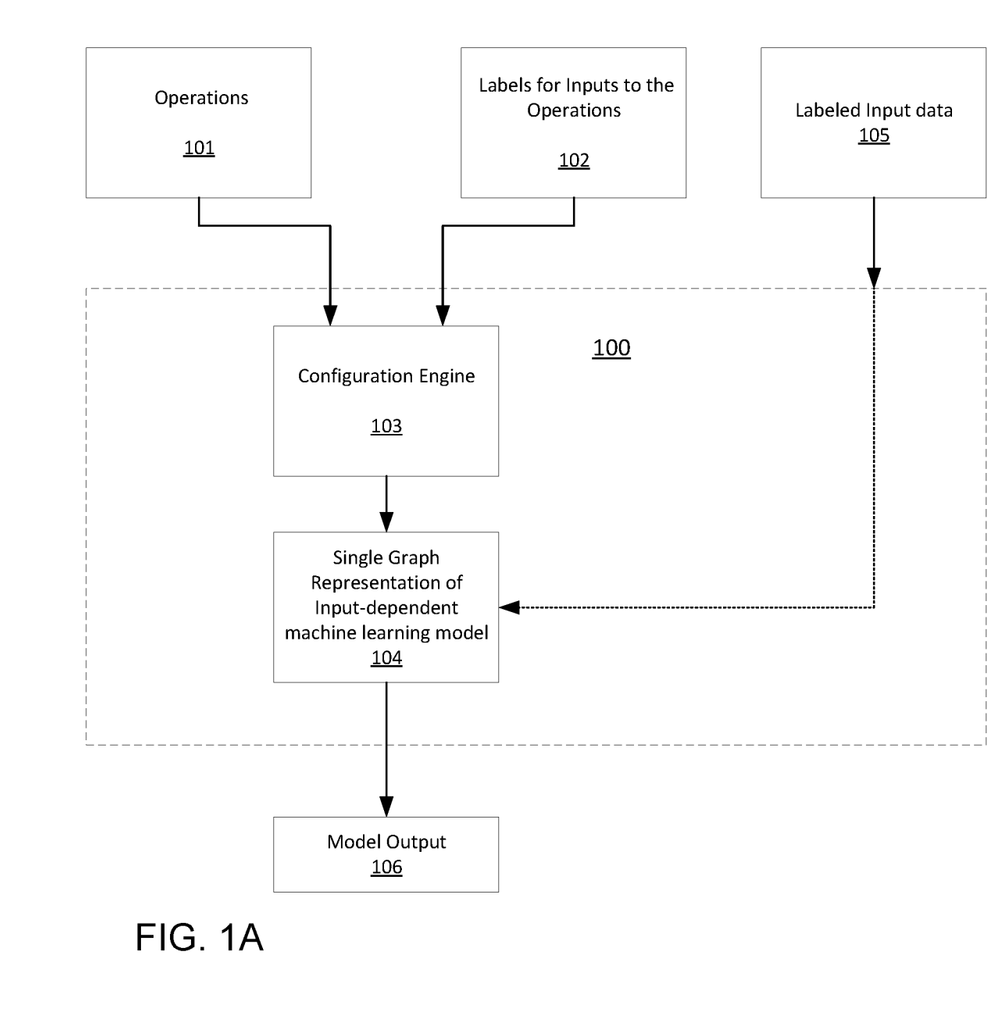
FIG. 1A illustrates an example machine learning system.

FIG. 1A illustrates an example machine learning system (100). The machine learning system (100) is an example of a system implemented as computer programs on one or more computers in one or more locations, in which the systems, components, and techniques described below are implemented.

The machine learning system (100) includes a configuration engine (103) that receives data identifying operations (101) which can be performed on a graph or tree input by a dynamically-structured machine learning model. These operations each take one or more arguments as input and produce a result output.

For each operation, the configuration engine (103) receives data that specifies the possible labels of each of the arguments of the operation. That is, each operation operates only on a subset of the possible labels that input data can have, and the received data identifies the subset of labels corresponding to each of the operation arguments.

The configuration engine (103) then connects nodes representing wiring vectors for each operation argument with nodes representing the corresponding operations as well as gather and concatenation operations to generate a computational graph that includes a respective node for every received operation and is augmented with additional nodes and edges to support processing arbitrary input trees. Generating the computational graph will be described in more detail below.

Once the computational graph has been generated, the machine learning system (100) can receive labeled input data (105) that can be scheduled by the computational graph representation of the machine learning model and processed to produce a model output (106).

An example system modifies the wiring vectors to adapt the data flow through the computational graph to match the input and, optionally, makes copies of the computational graph to account for the input having multiple levels.

The operations represented by the computational graph cause devices upon which the operations are scheduled to perform the operations using the specified data flow. Example techniques for executing operations represented by a computational graph are described in "TensorFlow: Large-Scale Machine Learning on Heterogeneous Distributed Systems," by Martin Abadi et al (Nov. 9, 2015).

The system 100 performs the operations to generate the particular output by partitioning the operations represented by the computational graph across multiple devices. The system 100 partitions the operations to the multiple devices over a data communication network, e.g., local area network (LAN) or wide area network (WAN). The devices perform the operations and, if applicable, return a respective output or indication to the system 100, which can return the requested output or indication to the client.

Any devices performing operations, e.g., devices, can include a memory, e.g., a random access memory (RAM), for storing instructions and data and a processor for executing stored instructions. Generally, each device is a hardware resource that performs operations independent of other devices. For example, each device can have its own processing unit. The devices can be Graphical Processing Units (GPUs) or Central Processing Units (CPUs). By way of illustration, one machine can host one or more devices, e.g., multiple CPUs and GPUs. Examples of such devices and machines can be seen in FIG. 1B.

Figure 1B:
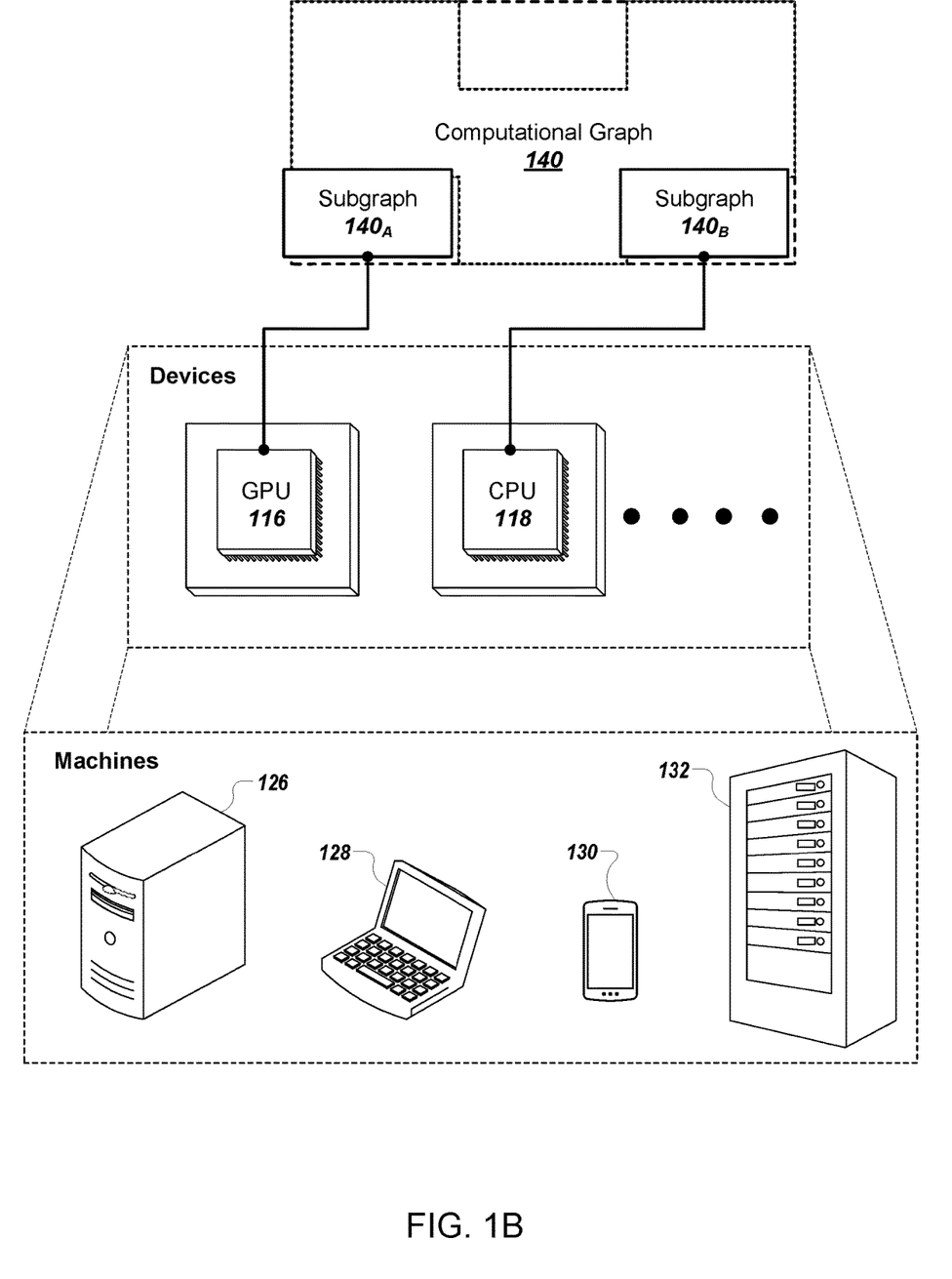
FIG. 1B is a conceptual diagram for an exemplary framework for distributing operations represented as computational graphs in the system of FIG. 1A.

FIG. 1B is a conceptual diagram for an exemplary framework for distributing operations represented as computational graphs in the system 100. Referring now to FIG. 1B, examples of machines may include a computing device 126, personal computer 128, mobile device 130, and server 132. Each machine may, for example, include one or more devices, such as GPU 116 and CPU 118.

Each device can also have a respective computational capability. That is, devices can have different amount of memories, processing speed, or other architectural characteristics. Thus, some devices can perform operations that other devices cannot. For example, some operations require a certain amount of memory that only particular devices have, or some devices are configured to only perform a particular type of operation, e.g., inference operations.

Generally, the labeled input data includes a set of input tokens and a tree that specifies labels for the input tokens. That is, the labels may be hierarchical, with labels in the first level of the tree directly labeling the input tokens in the input and labels in each higher level of the tree labeling either input tokens or labels from lower levels in the tree.

Figure 2A:
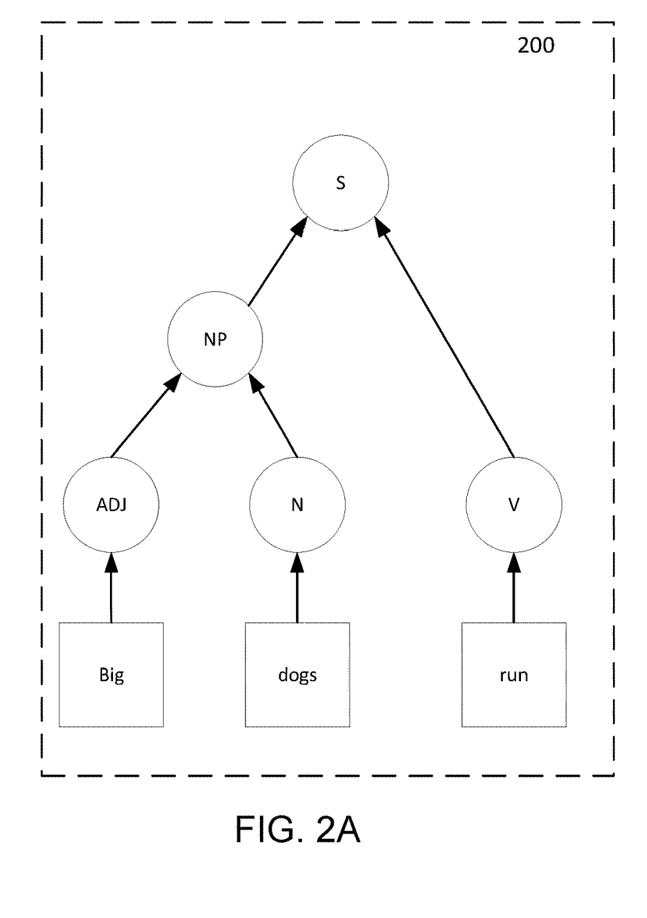
FIG. 2A illustrates a grammatical diagram of the sentence, "Big dogs run."
Figure 2B:
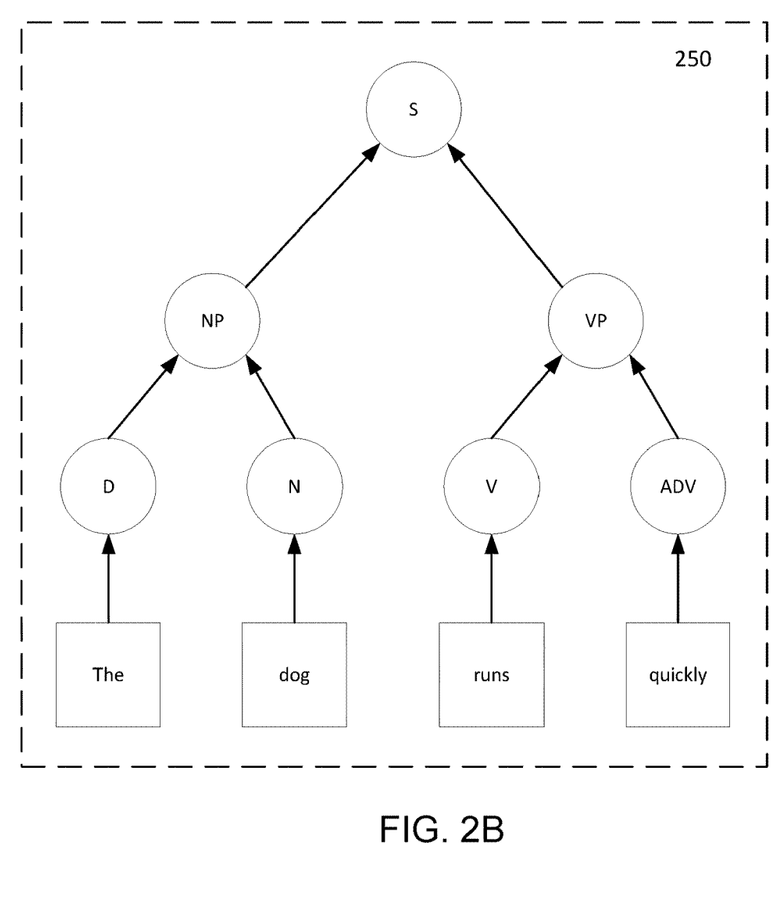
FIG. 2B illustrates a grammatical diagram of the sentence "The dog runs quickly."

FIGS. 2A and 2B illustrate two parse trees that differ in shape. These two parse trees can be inputs for a single dynamically structured machine learning model that is represented by a single computational graph constructed by the machine learning system 100.

FIG. 2A illustrates a grammatical diagram 200 of the sentence, "Big dogs run." In this example, "big" is an adjective, "dogs" is the noun, and "run" is the verb. The words of the parse tree are tokens that can be labeled so that an example system understands the datatype of each word. The phrase "big dogs" can be labeled as a noun phrase with "big" as the first argument of a noun phrase and "dogs" as the second argument of a noun phrase. The noun phrase taken together with the verb makes a complete sentence. As shown, the parse tree of this sentence is three levels deep with an adjective, noun, and verb at the first level, a noun phrase at the second level, and a full sentence representation at the third level.

FIG. 2B illustrates a grammatical diagram 250 of the sentence, "The dog runs quickly." In this example, "the" is a determiner, "dog" is a noun, "runs" is a verb, and "quickly" is an adverb. As described above, these data types can be labeled so that an example system understands the type of data each token of the parse tree represents. The phrase, "the dog" is a noun phrase and "runs quickly" is a verb phrase. The noun and verb phrases together make up a complete sentence. This parse tree of this sentence diagram is also three levels deep. However, this parse tree has a determiner, noun, verb, and adverb at a first level. The tree has a noun phrase and a verb phrase at the second level and the full sentence at the third level.

The examples of FIGS. 2A and 2B show that parse trees can have differing shapes. Providing parse trees or other graph data as input to a machine learning model therefore can result in the machine learning model dynamically changing structure depending on the input data that it processes. An example machine learning model performs different operations on different input labels, e.g., performs one operation on inputs that are labeled as nouns and another on inputs that are labeled as verbs. In order to represent possible structures of the machine learning model in a computational graph, the machine learning system 100 constructs a computational graph of fixed structure that is able to represent the model structure for all potential inputs to the model.

Figure 3:
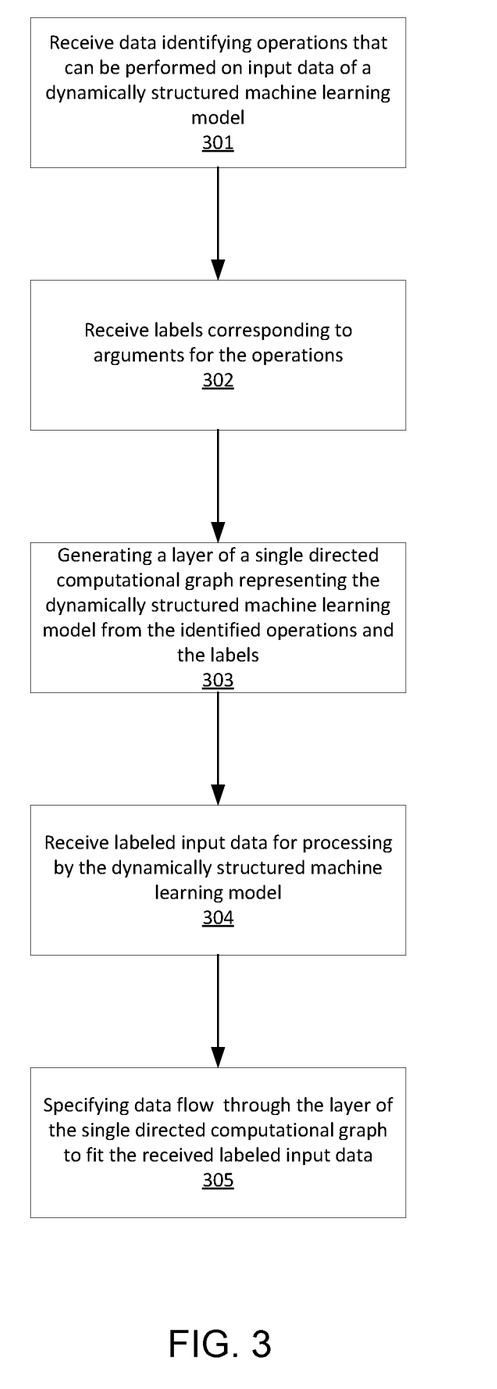
FIG. 3 is a flow diagram of an example process for constructing and using a single directed computational graph that represents a dynamically structured machine learning model.

FIG. 3 is a flow diagram of an example process 300 for constructing and using a single directed computational graph that represents a dynamically structured machine learning model. For convenience, the process 300 will be described as being performed by a system of one or more computers, located in one or more locations, and programmed appropriately in accordance with this specification. For example, a machine learning system, e.g., the machine learning system 100 of FIG. 1A, appropriately programmed, can perform the process 300.

The system receives data identifying operations that can be performed on input data of a dynamically structured machine learning model (301). Given the parsed sentence examples from FIGS. 2A and 2B, the system receives adjective, noun, verb, determiner, adverb, noun phrase, verb phrase, and sentence operations.

The system also receives labels corresponding to arguments of the operations (302). That is, for each operation, the system receives data identifying possible labels for each argument of the operation. For example, a label such as "NP Arg 1" represents that the data corresponding to this label should be input into the computational graph as the first argument of the noun phrase operation. Labels for the noun phrase operation can designate the first argument as either the output of a determiner operation or the output of an adjective operation. These labels can also designate the second argument as the output of a noun operation.

The system can then generate a computational graph representing a comprehensive layer of the dynamically structured machine learning model from the identified operations and the labels (303). The comprehensive layer is a layer that includes each possible operation that can be performed by the machine learning model.

The system generates the computational graph by, for each possible operation, first connecting a respective wire vector for each argument of the operation and graph input as input to a node representing a corresponding gather operation.

A wiring vector is a placeholder variable or a data fetch operation that fetches the indices for an argument of an operation. This type of vector is represented as a variable in the computational graph. Each operation argument has an equivalent wiring vector in the computational graph that denotes the presence of the operation argument. If the operation argument is present in the labeled input data as identified by its label, the wiring vector for the operation specifies the position of the input that has the label to which the operation argument corresponds. Wiring for operation arguments that are not present in the input are set to null or the empty set so that the example computational graph does not include these operation arguments in the data flow of the computational graph. The example system supports multiple instances of an operation argument using a wiring vector with a length greater than one. For example, if the example sentence of FIG. 2B is modified to "The dog and cat run quickly." The wiring vector for the noun operation argument would include a vector with two elements, 1 and 3 to represent that the nouns of the sentence are in the first and third position of the sentence using zero-based indexing.

A gather operation gathers slices from arguments of inputs according to indices that are specified by the gather operation call. This operation uses a type of vector addressing in which rows are selected from a vector given a list of row indices. Gather operations emulate physical multiplexers. That is, each gather operation receives an input and a wiring vector that specifies the location of the portion of the input that corresponds to the corresponding operation and outputs the corresponding of the input. An example system inserts one gather operation into the computational graph for each argument of each pre-declared operation including a pass-through operation for each operation type.

After connecting the wire vectors and input graphs to the nodes representing the gather operations, the example system then connects the nodes representing gather operations as input to nodes representing their corresponding operations. The example system then connects each node representing a possible operation to a node representing a concatenate operation to concatenate the outputs of the operations to complete a comprehensive layer of the dynamically structured machine learning model, which represents a level of the input graph. An example system includes one concatenation operation for each supported tensor type. Tensor type includes both a data type and a data shape. A tensor type is supported if it is an input or output type of an operation in the computational graph.

This process generates a directed computational graph representing a comprehensive layer of the machine learning model that is equivalent to one level of an input graph and can then be used to schedule inputs for a dynamically structured machine learning model.

Once the computational graph has been generated, the system can receive labeled input data for processing by the dynamically structured machine learning model (304) and specify the data flow through the graph to fit the received labeled input data (305).

Figure 4:
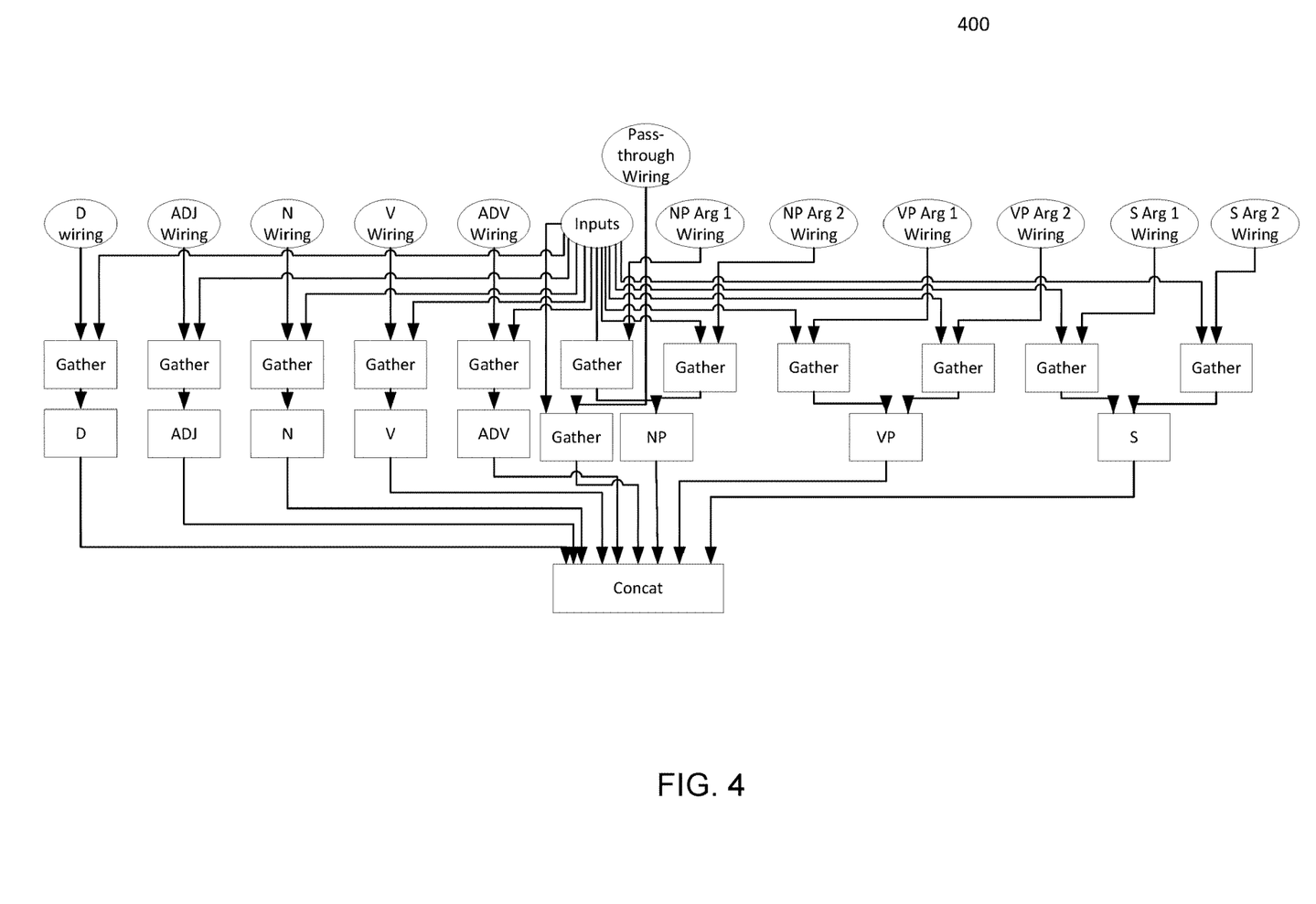
FIG. 4 illustrates a directed computational graph representing a comprehensive layer of a dynamically structured machine learning model that supports the emulation of arbitrary input graphs composed of words of type "D," "ADJ," "N," "ADV," "V," "NP," "VP," and "S."

FIG. 4 illustrates a computational graph 400 that supports the emulation of arbitrary input graphs composed of nodes of type, "D," "ADJ," "N," "ADV," "V," "NP," "VP," and "S." In FIG. 4, ovals represent placeholder variables and rectangles represent nodes which are operations or groups of operations that can be performed on input data. Variables and operation nodes in the computational graph are connected by edges to form a directed computational graph that represents a comprehensive layer of the dynamically structured machine learning model and corresponds to the first level of a parse tree. The "inputs" oval is filled with a matrix that contains the word vectors. Parse trees are used to specify the data flow of the word vectors. In this case, the inputs are word vectors that are numeric representations of sentence fragments, e.g. of words or phrases, and operations are operations that can be performed on sentence fragments. Wire vectors are generated for each operation argument as shown in FIG. 4. Each wiring vector is connected to a gather operation which then feeds into the appropriate operation to which the operation argument corresponds. The operations output results that are input to a concatenation operation.

In order to schedule input of FIG. 2A for processing, the example system of FIG. 4 takes in an input vector of word vectors, [<big>, <dogs>, <run>] with labels corresponding to the type of data that is represented by the inputs. The example system will set the values for the wiring vectors corresponding to the positions of the labeled input data at each level in the parse tree. For example, FIG. 4 is a directed computational graph that represents a first comprehensive layer of the machine learning model which corresponds to the first level of the parse tree illustrated in FIG. 2A. At the first level, the parse tree labels the token "big" as an adjective; token "dogs" as a noun; and token "run" as a verb. In this example, the example system receives this labeled data and then generates the corresponding wiring vectors of each placeholder variable accordingly. For example, the system sets the adjective (ADJ) wiring to [0] since the first element (at zero index) of the inputs vector is "big," which is labeled as an adjective.

In this example, the machine learning model system sets noun (N) wiring to [1] because the second element of the input vector is "dogs," which is labeled as a noun, and verb (v) wiring is set to [2] because the third element of the inputs vector is labeled as a verb, "run." All other wiring vectors are set to null or an empty vector. The example machine learning model system schedules this first comprehensive layer which corresponds to the first level of the parse tree so that in operation, executing the example configuration graph to the concatenation of the comprehensive layer results in the vector, [ADJ(<big>), N(<dogs>), V(<run>)].

Figure 5:
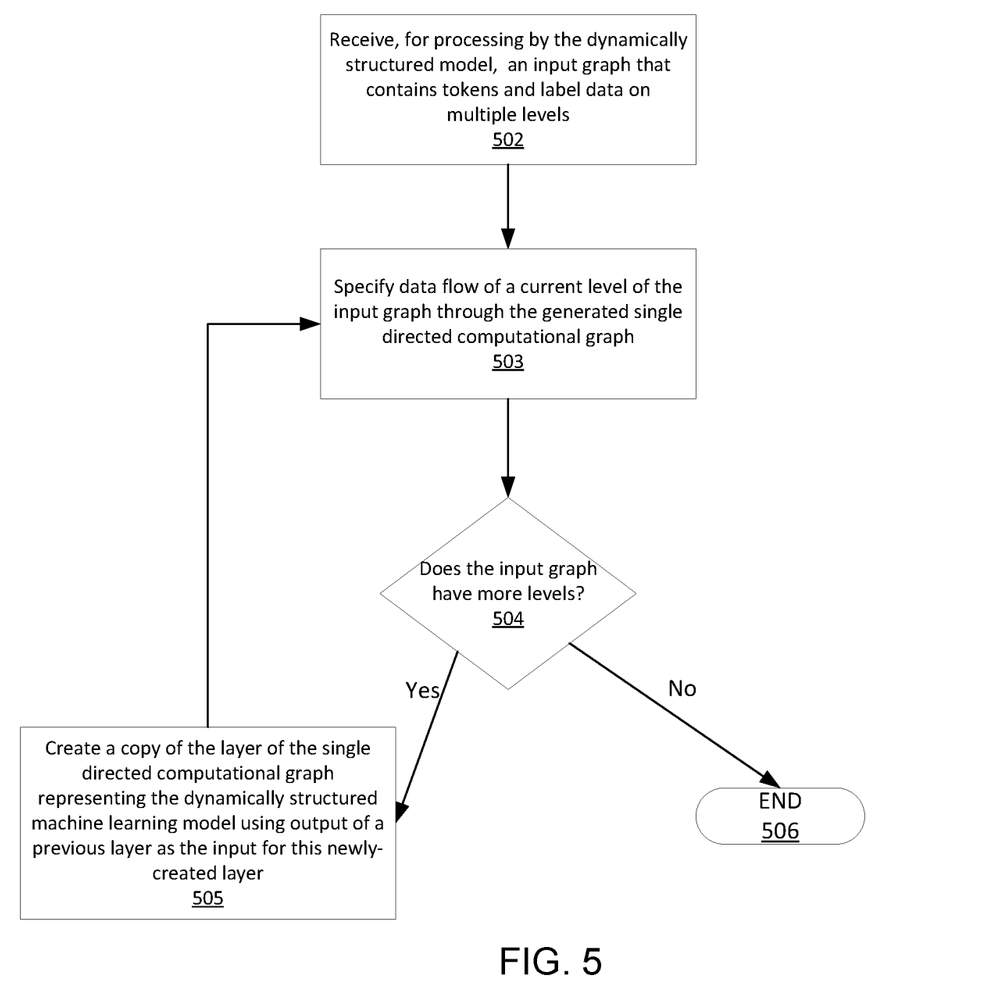
FIG. 5 is a flow diagram of an example process for constructing and using a single directed computational graph with multiple layers that represents a dynamically structured machine learning model.

FIG. 5 is a flow diagram of an example process 500 for constructing and using a single directed computational graph with multiple layers that represents a dynamically structured machine learning model. For convenience, the process 500 will be described as being performed by a system of one or more computers, located in one or more locations, and programmed appropriately in accordance with this specification. For example, a machine learning system, e.g., the machine learning system 100 of FIG. 1A, appropriately programmed, can perform the process 500.

The system receives labeled input data with multiple levels, i.e., a parse tree, for processing by the dynamically structured machine learning model (502).

The example system specifies the data flow through the current comprehensive layer of the graph using the received labeled input data (503). For subsequent levels of the input graph, the example system constructs a copy of the comprehensive layer of the computational graph representing the model using output of the previous comprehensive layer as input for the current layer.

As described, the parse tree of FIG. 2A has three levels that are hierarchical. Once the first comprehensive layer is scheduled, the example system constructs a second comprehensive layer of the computational graph that takes the output of the first comprehensive layer, [ADJ(<big>), N(<dogs>), V(<run>)], as input. In this second comprehensive layer, the computational graph uses the input and labels for this input data to determine that the token "ADJ(<big>) is the first argument of a noun phrase (NP) and the token "N(<dogs>)" is the second argument. All other wiring vectors are set to null or an empty vector. FIG. 4 shows an arrow between the inputs and the concatenation operation of the example computational graph that is an input to a gather operation, which also takes in a pass through wiring vector. This gather operation allows for level skipping in the parse tree, such as in FIG. 2A where there is no verb phrase so the verb input skips from level one to level three. In this case, the machine learning model system sets the pass through wiring vector toe [2] at the second level in order to pass V(<runs>) through the second layer. The system schedules the second comprehensive layer which corresponds to the second level of the parse tree so that in operation, executing the example computational graph to the concatenation of the comprehensive layer results in the vector, [NP (ADJ(<big>), N(<dogs>)), V(<runs>)].

The example system then constructs a third layer that takes the output of the second comprehensive layer, [NP (ADJ(<big>), N(<dogs>)), V(<runs>)] as input. The computational graph uses this input and labels of the data to determine that the token, NP (ADJ(<big>), N(<dogs>)) and the token, V(<runs>), are the first and second argument respectively for the sentence. "S Arg 1 Wiring" is therefore set to [0] and "S Arg 2 Wiring" is set to [1] at this comprehensive layer. All other wiring vectors are set to null or an empty vector. The system schedules the third comprehensive layer which corresponds to the third level of the parse tree so that in operation, executing the example computational graph to the concatenation of the layer results in [S(NP(ADJ(<big>), N(<dogs>)), V(<run>))].

Once all comprehensive layers have been added to the computational graph and data has been scheduled and processed, an example system uses a final gather operation to determine the output of the model. The last concatenation of the last comprehensive layer is passed through a final gather operation in order for the example system to select the results that should be outputted from the model. In this example the outputs are embedding vectors that represent phrases, e.g., S(NP(ADJ(<big>), N(<dogs>)), V(<run>))). The last gather operation filters out any nodes in the graph that have the maximal depth, but are not outputs. The gather operation also shuffles the remaining outputs into an order expected by the user. When the user tags nodes as outputs, the values corresponding to the nodes will appear in the machine learning model output tensor in the order that the nodes were tagged. In this example, the results can be fed into a network which tries to turn sentence-vectors into classifications.

The parse tree of FIG. 2B can be scheduled and processed by the computational graph of FIG. 4 in a similar manner to the parse tree of FIG. 2A as described above with wiring vectors set for the tokens and labels defining the parse tree of FIG. 2A. Because the parse tree of FIG. 2B has a different shape from the parse tree of FIG. 2A, the values of the wiring vectors will be different for the processing of the parse tree of FIG. 2B. Thus, different inputs to a dynamically-structured machine learning model can be handled effectively by modifying wiring vectors in a graph representation of a comprehensive machine learning layer and without rewriting the graph for each input.

While the above-described examples show at most one instance of each operation, an example system can support input graphs with multiple instances of an operation using wiring vectors with length greater than one. Additionally, the examples each show a single input graph for simplicity. However, an example system is capable of executing a batch of input graphs in parallel given the proper wiring connection. In particular, an example system can take in the union of a batch of graphs to generate a single, discontiguous, graph on which the algorithm can run.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The computer storage medium is not, however, a propagated signal. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate vector) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising:
  receiving data identifying a plurality of operations that can be performed on input data for processing by a dynamically structured machine learning model;
  receiving a plurality of labels corresponding to arguments for the plurality of operations;
  generating a directed computational graph representing a comprehensive layer of the dynamically structured machine learning model from the identified operations and labels, wherein the comprehensive layer is a layer that includes each possible operation that can be performed by the dynamically structured machine learning model;
  receiving an input for processing by the dynamically structured machine learning model, wherein the input includes a plurality of tokens and label data specifying labels for the plurality of tokens; and
  specifying data flow through the directed computational graph to fit the received labeled data.

Embodiment 1 may provide one or more of the following technical advantages or effects: the system can process inputs of various shapes without requiring that the computational graph be rewritten for each input. When an input is received to a dynamically structured machine learning model, the computational graph representing the model does not have to be rewritten and the input can efficiently be scheduled for processing by multiple hardware devices.

Embodiment 2 is the method of embodiment 1, wherein generating the directed computational graph includes:
  for each argument for each of the operations, inserting, into the computational graph, a respective variable representing a respective wiring vector that specifies a location of tokens having each label corresponding to the operation argument in a received input.

Embodiment 3 is the method of embodiment 2, wherein specifying data flow comprises:

for each argument for each operation, modifying the wiring vector to either (i) identify a location, in the input, of the token having the label corresponding to the argument or (ii) if no token has the label corresponding to the argument in the input, identify that no token of the argument exists in the input.

Embodiment 4 is the method of any one of the embodiments 2 or 3, wherein generating the directed computational graph includes: inserting, for each operation argument, a corresponding gather operation that receives as input the wiring vector associated with the operation argument and an input vector and outputs a result to the operation for which the operation argument corresponds.

Embodiment 5 is the method of any one of the embodiments 1 through 4, wherein generating a directed computational graph includes:

adding, to the computational graph, a concatenation operation to concatenate all results of operations in the layer.

Embodiment 6 is the method of any one of the embodiments 1 through 5, wherein specifying data flow through the single directed computational graph using the received labeled data includes:

determining whether the label data has multiple levels of labels;

in response to determining that the label data has multiple levels, generating, for each level of the label data, a copy of the computational graph as a new layer of the graph, wherein output of a previous layer of the computational graph is the input to a next layer of the graph.

Embodiment 7 is the method of embodiment 6 further comprising:

for each layer, modifying the wiring vectors according to the corresponding level in the label data.

Embodiment 8 is the method of any one of the embodiments 1 through 7 further comprising:

executing the operations of the computational graph; and
using a final gather operation to select results as output of the model.

Embodiment 9 is the method of any one of the embodiments 1 through 8 further comprising:

receiving a second input for processing by the dynamically structured machine learning model that includes a second plurality of tokens and second labeled data different from the received input; and modifying data flow through the layer of the single directed computational graph to fit the second labeled data.

Embodiment 10 is the method of claim 8, wherein executing the operations of the computational graph comprises:

allocating the nodes in the computational graph across a plurality of devices; and causing each of the devices to perform the operations represented by the nodes allocated to the device.

Embodiment 11 is a system comprising: one or more computers and one or more storage devices storing instructions that are operable, when executed by the one or more computers, to cause the one or more computers to perform the method of any one of claims 1 to 10.

Embodiment 12 is a computer storage medium encoded with a computer program, the program comprising instructions that are operable, when executed by data processing apparatus, to cause the data processing apparatus to perform the method of any one of claims 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving data specifying a dynamically structured machine learning model, comprising:

receiving data identifying a plurality of operations that can be performed on input data for processing by the dynamically structured machine learning model, and receiving a plurality of labels corresponding to arguments for the plurality of operations, wherein the dynamically structured machine learning model is configured to process the input data using one or more of the plurality of operations to generate output data;

generating data representing a directed computational graph of the dynamically structured machine learning model, the directed computational graph comprising a comprehensive layer that represents each possible operation of the plurality of operations that can be performed by the dynamically structured machine learning model, wherein the comprehensive layer is configured to perform any combination of one or more of the plurality of operations that would be required to be performed by the dynamically structured machine learning model, for any of a plurality of different received inputs;

receiving an input for processing by the dynamically structured machine learning model, wherein the input includes a plurality of tokens and label data specifying labels for the plurality of tokens;

specifying data flow through the directed computational graph to fit the received input; and executing the directed computational graph on one or more computing devices to process the input in accordance with the specified data flow.

2. The method of claim 1, wherein generating the data representing the directed computational graph includes:

for each argument for each of the operations, inserting, into the directed computational graph, a respective variable representing a respective wiring vector that specifies a location of tokens having each label corresponding to the operation argument in a received input.

3. The method of claim 2, wherein specifying data flow comprises:

for each argument for each operation, modifying the wiring vector to either (i) identify a location in the received input of a respective token having the label corresponding to the argument or (ii) identify that no token of the argument exists in the received input, if no token has the label corresponding to the argument in the input.

4. The method of claim 2, wherein generating the data representing the directed computational graph includes:

inserting, for each operation argument, a corresponding gather operation that receives, as input the wiring vector associated with the operation argument and an input vector, and outputs a result to the operation for which the operation argument corresponds.

5. The method of claim 1, wherein generating the directed computational graph includes:

adding, to the directed computational graph, a concatenation operation to concatenate all results of operations in the comprehensive layer.

6. The method of claim 1, wherein executing the directed computational graph comprises:

using a final gather operation to select results of processing the input in accordance with the specified data flow as output of the model.

7. The method of claim 1, wherein the input is a first input, and wherein the method further comprises:

receiving a second input for processing by the dynamically structured machine learning model that includes a second plurality of tokens and second label data different from the plurality of tokens and the label data included in the first input; and specifying data flow through the directed computational graph to fit the second input.

8. The method of claim 1, wherein executing the directed computational graph comprises:

allocating nodes in the computational graph across the one or more computing devices; and causing each of the computing devices to perform operations represented by the nodes allocated to the computing device.

9. The method of claim 1, wherein receiving data specifying the dynamically structured machine learning model comprises receiving a maximum count of levels for the plurality of labels, wherein each of the plurality of labels corresponds to a respective level, and wherein generating the data representing the directed computational graph of the dynamically structured machine learning model comprises, for each level starting from an initial level up to the maximum count of levels, generating a respective comprehensive layer corresponding to the level, wherein each comprehensive layer that does not correspond to the initial level receives input from a previous comprehensive layer.

10. The method of claim 9, wherein specifying data flow through the directed computational graph comprises specifying, at each comprehensive layer, data flow through one or more operations in the comprehensive layer that receive, as arguments, respective one or more tokens with labels corresponding to the comprehensive layer.

11. A system comprising:

one or more computers; and one or more storage devices storing instructions that are operable, when executed by the one or more computers, to cause the one or more computers to perform operations comprising:

receiving data specifying a dynamically structured machine learning model, comprising:

receiving data identifying a plurality of operations that can be performed on input data for processing by the dynamically structured machine learning model, and receiving a plurality of labels corresponding to arguments for the plurality of operations, wherein the dynamically structured machine learning model is configured to process the input data using one or more of the plurality of operations to generate output data;

generating data representing a directed computational graph of the dynamically structured machine learning model, the directed computational graph comprising a comprehensive layer that represents each possible operation of the plurality of operations that can be performed by the dynamically structured machine learning model, wherein the comprehensive layer is configured to perform any combination of one or more of the plurality of operations that would be required to be performed by the dynamically structured machine learning model, for any of a plurality of different received inputs;

receiving an input for processing by the dynamically structured machine learning model, wherein the input includes a plurality of tokens and label data specifying labels for the plurality of tokens;

specifying data flow through the directed computational graph to fit the received input; and executing the directed computational graph on one or more computing devices to process the input in accordance with the specified data flow.

12. The system of claim 11, wherein generating the data representing the directed computational graph includes:

for each argument for each of the operations inserting, into the directed computational graph, a respective variable representing a respective wiring vector that specifies a location of tokens having each label corresponding to the operation argument in a received input.

13. The system of claim 12, wherein generating the data representing the directed computational graph includes:

inserting, for each operation argument, a corresponding gather operation that receives, as input the wiring vector associated with the operation argument and an input vector and outputs a result to the operation for which the operation argument corresponds.

14. The system of claim 11, wherein specifying data flow comprises:

for each argument for each operation, modifying the wiring vector to either (i) identify a location, in the received input of a respective token having the label corresponding to the argument or (ii) identify that no token of the argument exists in the received input, if no token has the label corresponding to the argument in the input.

15. The system of claim 11, wherein generating a directed computational graph includes:
adding, to the directed computational graph, a concatenation operation to concatenate all results of operations in the comprehensive layer.

16. The system of claim 11, wherein executing the directed computational graph comprises:
using a final gather operation to select results of processing the input in accordance with the specified data flow as output of the model.

17. The system of claim 11, wherein the input is a first input, and wherein the method further comprises:
receiving a second input for processing by the dynamically structured machine learning model that includes a second plurality of tokens and second label data different from the plurality of tokens and the label data included in the first input; and
specifying data flow through the directed computational graph to fit the second input.

18. The system of claim 11, wherein executing directed computational graph comprises:
allocating nodes in the computational graph across the one or more devices; and
causing each of the computing devices to perform operations represented by the nodes allocated to the computing device.

19. The system of claim 11,
wherein receiving data specifying the dynamically structured machine learning model comprises receiving a maximum count of levels for the plurality of labels, wherein each of the plurality of labels corresponds to a respective level, and
wherein generating the data representing the directed computational graph of the dynamically structured machine learning model comprises, for each level starting from an initial level up to the maximum count of levels, generating a respective comprehensive layer corresponding to the level, wherein each comprehensive layer that does not correspond to the initial level receives input from a previous comprehensive layer.

20. The system of claim 19, wherein specifying data flow through the directed computational graph comprises specifying, at each comprehensive layer, data flow through one or more operations in the comprehensive layer that receive, as arguments, respective one or more tokens with labels corresponding to the comprehensive layer.

21. A non-transitory computer-readable storage medium comprising instructions stored thereon that are executable by a processing device and upon such execution cause the processing device to perform operations comprising:
receiving data specifying a dynamically structured machine learning model, comprising:
receiving data identifying a plurality of operations that can be performed on input data for processing by the dynamically structured machine learning model, and
receiving a plurality of labels corresponding to arguments for the plurality of operations,
wherein the dynamically structured machine learning model is configured to process the input data using one or more of the plurality of operations to generate output data;
generating data representing a directed computational graph of the dynamically structured machine learning model, the directed computational graph comprising a comprehensive layer that represents each possible operation of the plurality of operations that can be performed by the dynamically structured machine learning model, wherein the comprehensive layer is configured to perform any combination of one or more of the plurality of operations that would be required to be performed by the dynamically structured machine learning model, for any of a plurality of different received inputs;
receiving an input for processing by the dynamically structured machine learning model, wherein the input includes a plurality of tokens and label data specifying labels for the plurality of tokens;
specifying data flow through the directed computational graph to fit the received input; and
executing the directed computational graph on one or more computing devices to process the input in accordance with the specified data flow.

22. The non-transitory computer-readable storage medium of claim 21, wherein generating the data representing the directed computational graph includes:
for each argument for each of the operations inserting, into the directed computational graph, a respective variable representing a respective wiring vector that specifies a location of tokens having each label corresponding to the operation argument in a received input.

23. The non-transitory computer-readable storage medium of claim 22, wherein specifying data flow comprises:
for each argument for each operation, modifying the wiring vector to either (i) identify a location, in the received input of a respective token having the label corresponding to the argument or (ii) identify that no token of the argument exists in the received input, if no token has the label corresponding to the argument in the input.

24. The non-transitory computer-readable storage medium of claim 22, wherein generating the data representing the directed computational graph includes:
inserting, for each operation argument, a corresponding gather operation that receives, as input, the wiring vector associated with the operation argument and an input vector and outputs a result to the operation for which the operation argument corresponds.

25. The non-transitory computer-readable storage medium of claim 21, wherein generating a directed computational graph includes:
adding, to the directed computational graph, a concatenation operation to concatenate all results of operations in the comprehensive layer.

26. The non-transitory computer-readable storage medium of claim 21, wherein executing the directed computational graph comprises:
using a final gather operation to select results of processing the input in accordance with the specified data flow as output of the model.

27. The non-transitory computer-readable storage medium of claim 21, wherein the input is a first input, and wherein the method further comprises:
receiving a second input for processing by the dynamically structured machine learning model that includes a second plurality of tokens and second label data different from the plurality of tokens and the label data included in the first input; and specifying data flow through the directed computational graph to fit the second input.

28. The non-transitory computer-readable storage medium of claim 21, wherein executing directed computational graph comprises:
- allocating nodes in the computational graph across the one or more computing devices; and
- causing each of the computing devices to perform operations represented by the nodes allocated to the device.

29. The computer-readable media of claim 21,
- wherein receiving data specifying the dynamically structured machine learning model comprises receiving a maximum count of levels for the plurality of labels, wherein each of the plurality of labels corresponds to a respective level, and
- wherein generating the data representing the directed computational graph of the dynamically structured machine learning model comprises, for each level starting from an initial level up to the maximum count of levels, generating a respective comprehensive layer corresponding to the level, wherein each comprehensive layer that does not correspond to the initial level receives input from a previous comprehensive layer.

30. The computer-readable media of claim 29, wherein specifying data flow through the directed computational graph comprises specifying, at each comprehensive layer, data flow through one or more operations in the comprehensive layer that receive, as arguments, respective one or more tokens with labels corresponding to the comprehensive layer.

* * * * *

UNITED STATES PATENT AND TRADEMARK OFFICE
CERTIFICATE OF CORRECTION

PATENT NO. : 10,776,714 B2  
APPLICATION NO. : 15/344160  
DATED : September 15, 2020  
INVENTOR(S) : Herreshoff Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*